United States Patent
Bao et al.

(10) Patent No.: US 10,147,972 B2
(45) Date of Patent: Dec. 4, 2018

(54) LITHIUM ION BATTERY HAVING TAPE WITH ADHESIVE ADHERING WOUND-TYPE CELL TO PACKAGING FILM

(71) Applicant: Dongguan Amperex Technology Limited, Dongguan (CN)

(72) Inventors: Jinzhen Bao, Dongguan (CN); Hongxin Fang, Dongguan (CN); Conghui You, Dongguan (CN); Peipei Guo, Dongguan (CN); Zhong Shi, Dongguan (CN); Huali Zhou, Dongguan (CN)

(73) Assignee: DONGGUAN AMPEREX TECHNOLOGY LIMITED, Dongguan, Guangdong Province (CN)

( * ) Notice: Subject to any disclaimer, the term of this patent is extended or adjusted under 35 U.S.C. 154(b) by 529 days.

(21) Appl. No.: 14/591,738

(22) Filed: Jan. 7, 2015

(65) Prior Publication Data
US 2015/0207179 A1 Jul. 23, 2015

(30) Foreign Application Priority Data
Jan. 23, 2014 (CN) .................... 2014 2 0044841 U

(51) Int. Cl.
*H01M 2/02* (2006.01)
*H01M 2/20* (2006.01)
(Continued)

(52) U.S. Cl.
CPC ....... *H01M 10/0587* (2013.01); *H01M 2/021* (2013.01); *H01M 2/029* (2013.01);
(Continued)

(58) Field of Classification Search
CPC ............. H01M 10/0587; H01M 2/209; H01M 2/0212; H01M 2/0277; H01M 2/021
(Continued)

(56) References Cited

U.S. PATENT DOCUMENTS

| | | | | |
|---|---|---|---|---|
| 2008/0233474 A1* | 9/2008 | Son | .................... | H01M 2/18 429/129 |
| 2011/0076533 A1* | 3/2011 | Choi | .................... | H01M 2/0426 429/94 |
| 2011/0287302 A1* | 11/2011 | Kim | .................... | H01M 2/022 429/163 |

FOREIGN PATENT DOCUMENTS

CN 202205852 U * 4/2012
CN 105390627 A * 3/2016

OTHER PUBLICATIONS

Heng Zhang, Machine Translation of CN 202205852 U, Apr. 2012 (Year: 2012).*

* cited by examiner

*Primary Examiner* — Sean P Cullen
(74) *Attorney, Agent, or Firm* — Morgan, Lewis & Bockius LLP

(57) ABSTRACT

The present application provides a lithium-ion battery, which comprises: a wound-type cell formed by winding a positive electrode plate, a separator and a negative electrode plate, a width of the separator is greater than widths of the positive electrode plate and the negative electrode plate; an electrolyte; and a packaging film packaging the wound-type cell and accommodating the electrolyte; a wound ending of the wound-type cell is adhered with a single-sided adhesive layer, an adhesive of the single-sided adhesive layer is a flowable curing adhesive, the wound-type cell and the packaging film are adhered together by the curing adhesive which flows and flows out from a periphery of the single-sided adhesive layer. The single-sided adhesive layer can prevent the wound-type cell from loosening or deforming, rupturing of the positive electrode tab and the negative electrode tab and bursting open of a top-seal in the process of dropping or tumbling.

11 Claims, 5 Drawing Sheets

(51) Int. Cl.
*H01M 10/0587* (2010.01)
*H01M 10/0525* (2010.01)
*H01M 10/04* (2006.01)

(52) U.S. Cl.
CPC ....... *H01M 2/0212* (2013.01); *H01M 2/0277* (2013.01); *H01M 10/0431* (2013.01); *H01M 10/0525* (2013.01)

(58) Field of Classification Search
USPC .......................................... 429/94, 163, 185
See application file for complete search history.

FIG.1 (original)

FIG.2 (original)

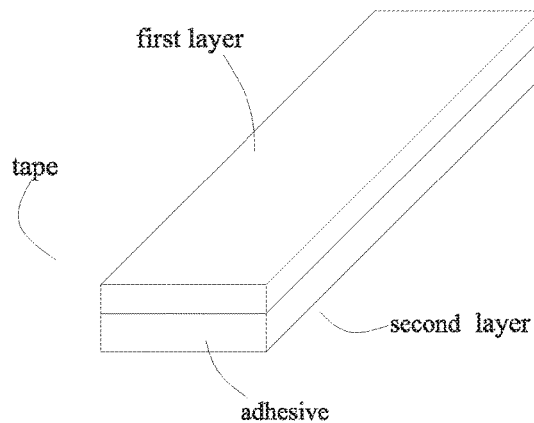
FIG.3 (NEW)
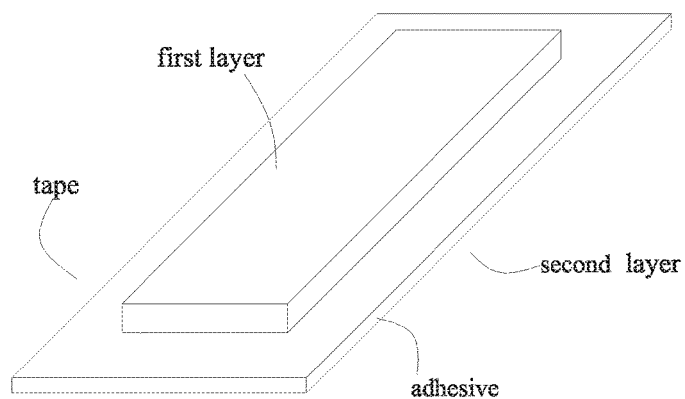
FIG.4 (NEW)
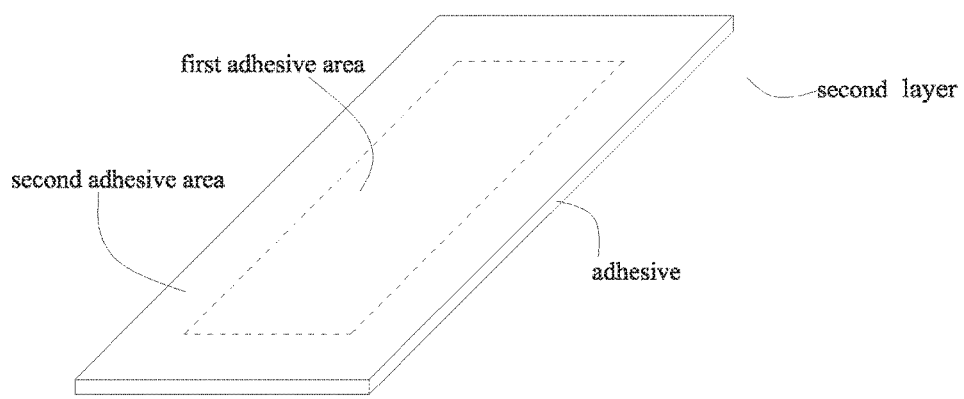
FIG.5 (NEW)

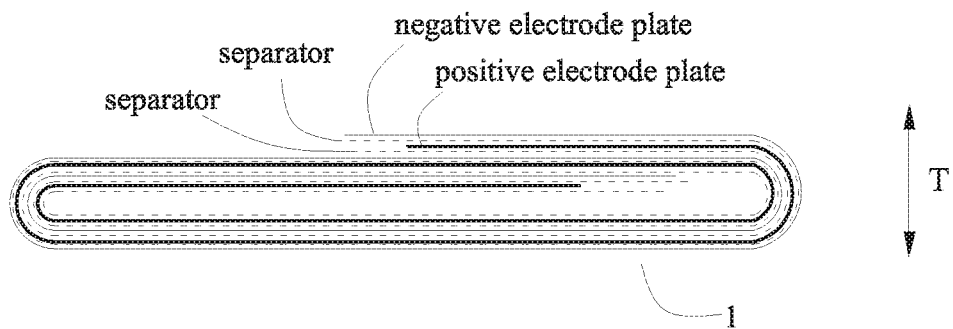
FIG.6 (NEW)
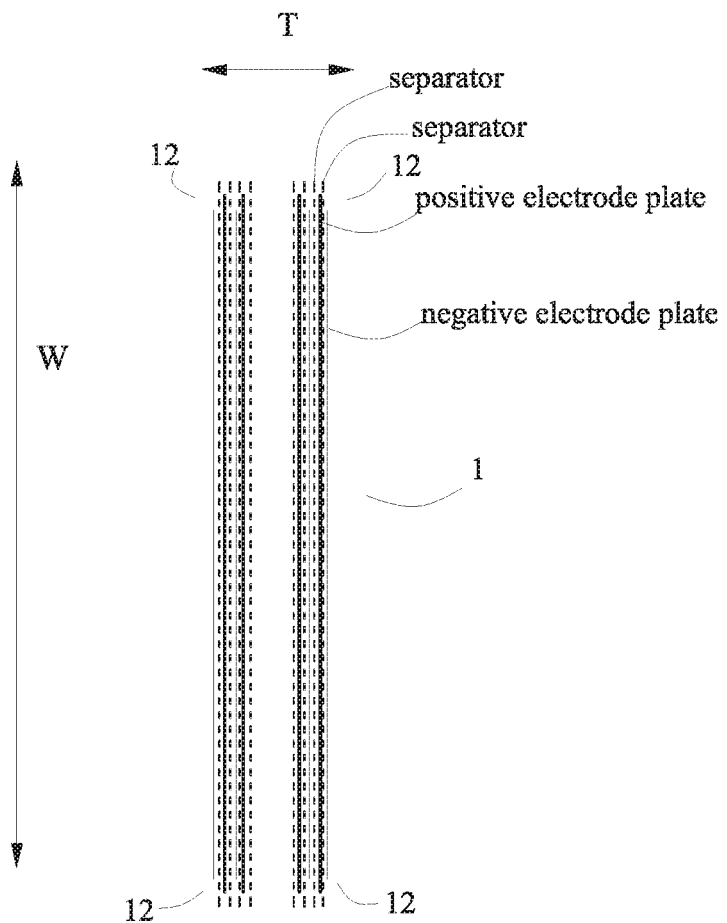
FIG.7 (NEW)

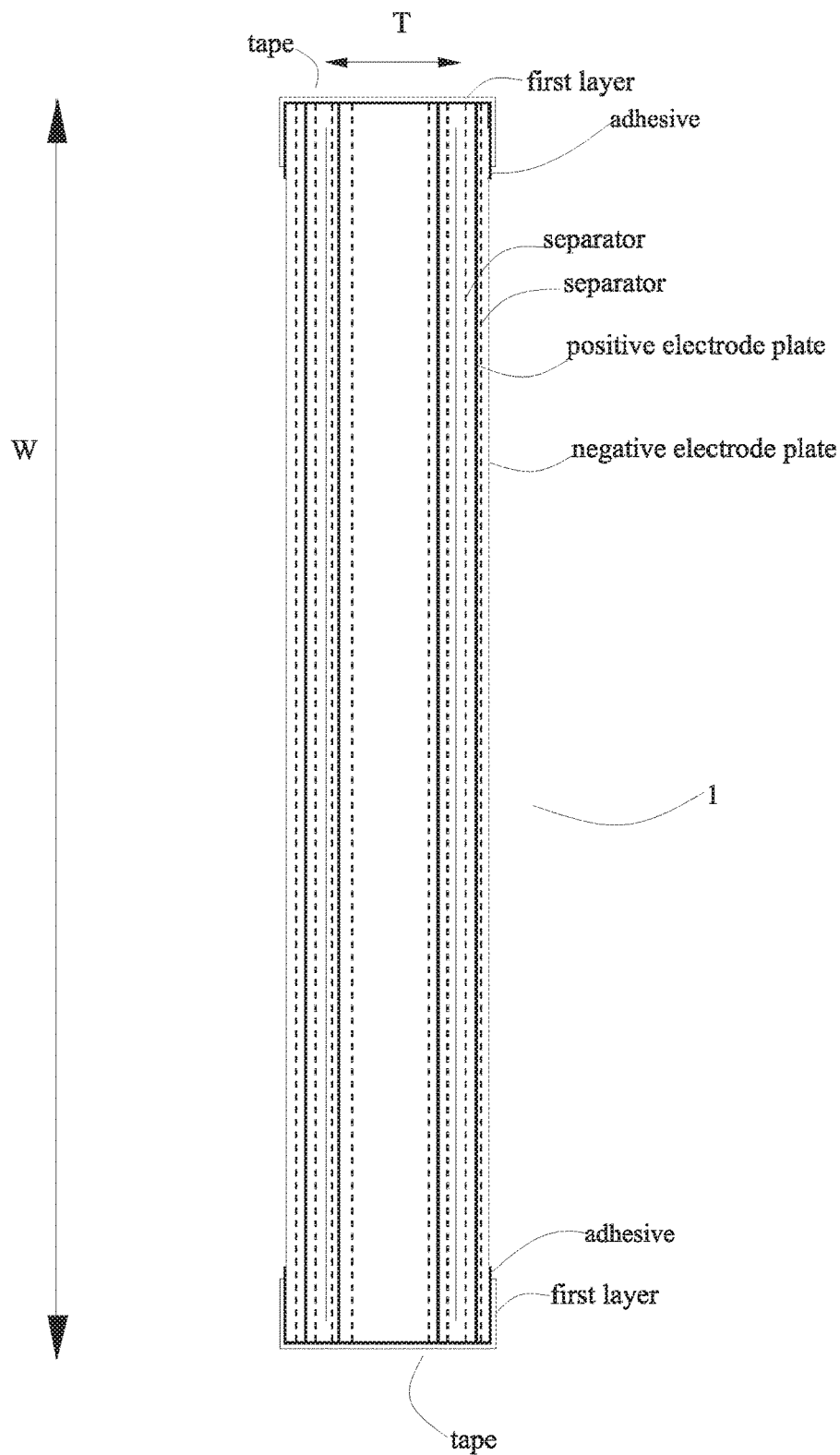
FIG.8 (NEW)

US 10,147,972 B2

LITHIUM ION BATTERY HAVING TAPE WITH ADHESIVE ADHERING WOUND-TYPE CELL TO PACKAGING FILM

CROSS-REFERENCE TO RELATED APPLICATIONS

The present application claims priority to Chinese patent application No. 201420044841.8 filed on Jan. 23, 2014, which is incorporated herein by reference in its entirety.

TECHNICAL FIELD OF THE PRESENT DISCLOSURE

The present disclosure relates to a battery, and particularly relates to a lithium-ion battery.

BACKGROUND OF THE PRESENT DISCLOSURE

Due to many advantages, such as high voltage, small size, light weight, high specific capacity, no memory effect, no pollution, low self-discharge, long cycle life and the like, a lithium-ion battery has been unprecedentedly developed during applications in many fields, including the fields of telecommunications, electric appliances, electronic information, and power equipment, energy storage and the like. However, with the rapid development of society, these applications have increasingly higher requirements for energy density, charge and discharge rates, cycle life of the lithium-ion battery, and at the same time, it also requires that the lithium-ion battery has a reliable safety performance.

There are many factors which have an influence on the safety performance of the lithium-ion battery. Positive and negative electrode materials, an electrolyte and its additives, and a structure and preparation process conditions of the lithium-ion battery have a significant influence on the safety performance of the lithium-ion battery. The thermal stability of the lithium-ion battery can be improved by selecting the positive and negative electrode materials, the electrolyte and its flame retardant which have good thermal stability; an overcharge protection additive is added in the electrolyte, which can effectively improve an overcharge performance of the lithium-ion battery; short-circuiting of the lithium-ion battery can be reduced by well-controlled preparation process conditions and reasonable use.

However, increasingly severe safety test conditions of the lithium-ion battery put forward higher requirements on the safety performance of the lithium-ion battery. For example, a drop test, a tumbling test and the like put forward more severe requirements on appearance and internal short-circuiting and the like of the lithium-ion battery. Some conventional improved methods are often unable to meet the new test conditions, and difficulty and technical cost for continuing to improve the conventional material systems and preparation process are also greatly increased. Therefore, it is necessary to provide a lithium-ion battery which effectively meets the severe safety test requirements at present, while the process operation is simple, the cost is low, and it is easy to realize.

SUMMARY OF THE PRESENT DISCLOSURE

In view of the problem existing in the background, an object of the present disclosure is to provide a lithium-ion battery, which can prevent a wound-type cell from sliding in a packaging film in the process of dropping or tumbling.

In order to achieve the above object, the present application provides a lithium-ion battery, which comprises: a wound-type cell formed by winding a positive electrode plate, a separator and a negative electrode plate, a width of the separator is greater than widths of the positive electrode plate and the negative electrode plate; an electrolyte; and a packaging film packaging the wound-type cell and accommodating the electrolyte; a wound ending of the wound-type cell is adhered with a single-sided adhesive layer, an adhesive of the single-sided adhesive layer is a flowable curing adhesive, the wound-type cell and the packaging film are adhered together by the curing adhesive which flows and flows out from a periphery of the single-sided adhesive layer.

The present application has the following beneficial effects:

The wound ending of the wound-type cell is adhered with the single-sided adhesive layer, which can prevent the wound-type cell from loosening or deforming after completion of winding and before putting into the packaging film, and the single-sided adhesive layer can facilitate putting the wound-type cell into the packaging film. The wound-type cell and the packaging film can be adhered effectively by the flowable curing adhesive of the single-sided adhesive layer, which prevents the problems of deforming of the wound-type cell, rupturing of the positive electrode tab and the negative electrode tab and bursting open of an top-seal which are caused by that the wound-type cell slides in the packaging film in the process of dropping or tumbling. In addition, the operation is simple, the cost is low, and the energy density can also be improved effectively.

BRIEF DESCRIPTION OF THE FIGURES

FIG. 3 is a schematic view of a tape of the present invention before an adhesive of the second layer flows.

FIG. 4 is a schematic view of the tape of the present invention after the adhesive of the second layer flows.

FIG. 5 is a perspective view viewed from below of FIG. 4 illustrating the a first adhesive area and a second adhesive area.

FIG. 6 is a sectional schematic view of a wound-type cell of the present invention before the tape is provided to the wound-type cell.

FIG. 7 is another sectional schematic view of the wound-type cell of the present invention before the tape is provided to the wound-type cell.

FIG. 8 is a sectional schematic view corresponding to FIG. 4 with the tape provided to the wound-type cell and an adhesive has flowed and flowed out from a periphery of the first layer of the tape.

Figure 1:
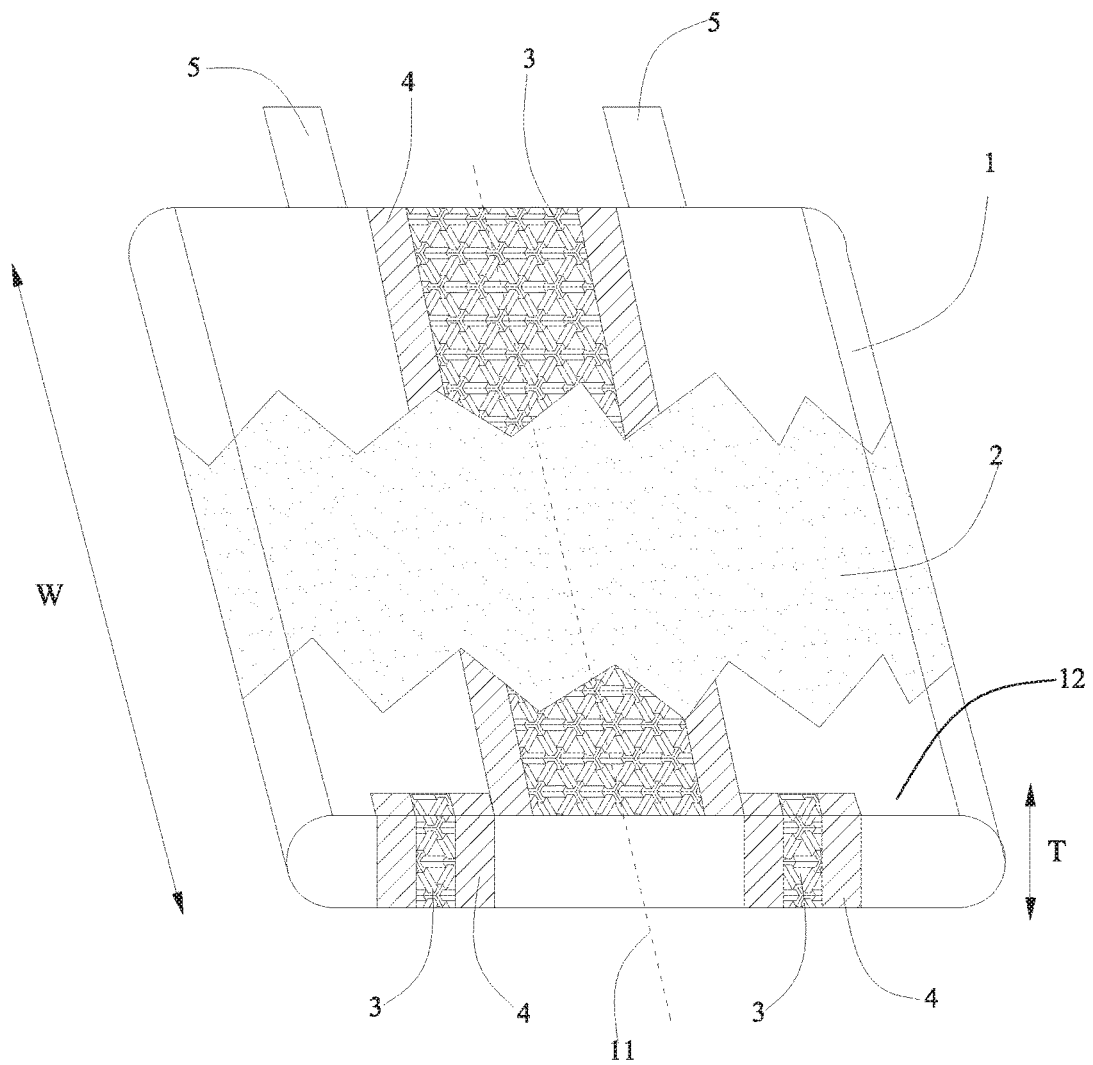
FIG. 1 is a perspective view of an embodiment of a lithium-ion battery according to the present application, for purpose of clarity, an upper part and a lower part of a packaging film are shown in a transparent manner, and a wound ending is shown schematically by a dashed line.

Reference numerals of the embodiments are represented as follows:

> 1 wound-type cell
>    11 wound ending
>    12 edge portion
> 2 packaging film
> 3 single-sided adhesive layer
> 4 curing adhesive
> 5 electrode tab
> W width direction
> T thickness direction

DETAILED DESCRIPTION

Hereinafter a lithium-ion battery according to the present application will be described in detail in combination with the figures.

Figure 2:
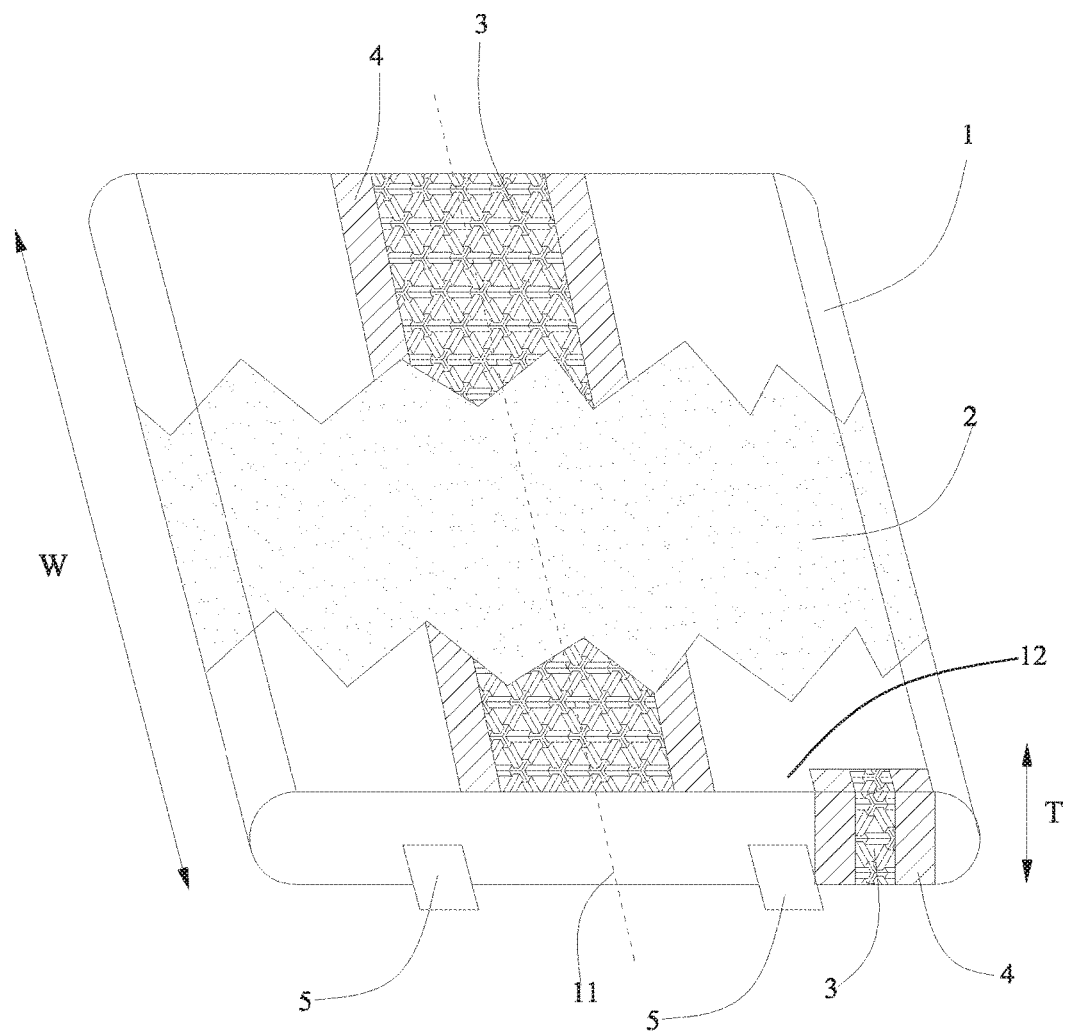
FIG. 2 is a perspective view of FIG. 1 viewed from an opposite angle, for purpose of clarity, the upper part and the lower part of the packaging film are shown in a transparent manner, the wound ending is shown schematically by a dashed line.

Referring to FIG. 1 and FIG. 2, a lithium-ion battery according to the present application comprises: a wound-type cell 1 formed by winding a positive electrode plate (not shown), a separator (not shown) and a negative electrode plate (not shown), a width of the separator is greater than widths of the positive electrode plate and the negative electrode plate; an electrolyte; and a packaging film 2 packaging the wound-type cell 1 and accommodating the electrolyte. A wound ending 11 of the wound-type cell 1 is adhered with a single-sided adhesive layer 3 having an adhesive side and a non-adhesive side opposite the adhesive side, an adhesive on the adhesive side of the single-sided adhesive layer 3 is a flowable curing adhesive 4, the wound-type cell 1 and the packaging film 2 are adhered together by the curing adhesive 4 which flows and flows out from a periphery of the single-sided adhesive layer 3.

The wound ending 11 of the wound-type cell 1 is adhered with the single-sided adhesive layer 3, which can prevent the wound-type cell 1 from loosening or deforming after completion of winding and before putting into the packaging film 2, and the single-sided adhesive layer 3 can facilitate putting the wound-type cell 1 into the packaging film 2. The wound-type cell 1 and the packaging film 2 can be adhered effectively by the flowable curing adhesive 4 of the single-sided adhesive layer 3, which prevents the problems of deforming of the wound-type cell 1, rupturing of the positive electrode tab and the negative electrode tab and bursting open of an top-seal which are caused by that the wound-type cell 1 slides in the packaging film 2 in the process of dropping or tumbling. In addition, the operation is simple, the cost is low, and the energy density can also be improved effectively.

In an embodiment of the lithium-ion battery according to the present application, referring to FIG. 1 and FIG. 2, at least a side of the wound-type cell 1 in a width direction W is also adhered with the single-sided adhesive layer 3, portions of the separator beyond the positive electrode plate and the negative electrode plate on the same side of the wound-type cell 1 in the width direction W are adhered together by the curing adhesive 4 which is positioned on this side, flows and flows out from a periphery of the single-sided adhesive layer 3 on the same side, and the portions of the separator and the packaging film 2 are adhered together by the curing adhesive 4 which flows and flows out from the periphery of the single-sided adhesive layer 3 on the same side.

The portions of the separator beyond the positive electrode plate and the negative electrode plate on the same side of the wound-type cell 1 in the width direction W are adhered together, which can prevent the opposite positive electrode plate and negative electrode plate from contacting and short-circuiting caused by that the separator wrinkles or folds in the process of dropping or tumbling of the wound-type cell 1; secondly, the portions of the separator are adhered together, which can prevent the wound-type cell 1 from short-circuiting caused by that the separator shrinks in a cycle process; thirdly, the portions of the separator and the packaging film 2 are adhered together by the curing adhesive 4, which prevents problems of deforming of the wound-type cell 1, rupturing of the positive electrode tab and the negative electrode tab, and bursting open of the top-seal which are caused by that the wound-type cell 1 slides in the packaging film 2 in the process of dropping or tumbling.

It should be noted that, the number of the single-sided adhesive layer 3 provided on the same side of the wound-type cell 1 in the width direction W can be one or more than one, and a position of the single-sided adhesive layer 3 can be changed, it only needs to ensure that the portions of the separator beyond the positive electrode plate and the negative electrode plate on the same side of the wound-type cell 1 in the width direction W are adhered together according to needs. In the FIG. 1 and FIG. 2, the number of the single-sided adhesive layer 3 provided on the side of the wound-type cell 1 provided with the electrode tab 5 in the width direction W is one, the number of the single-sided adhesive layer 3 provided on the side of the wound-type cell 1 opposite to the side provided with the electrode tab 5 in the width direction W is two, of course it is not limited to that, it can be determined according to actual needs.

In an embodiment of the lithium-ion battery according to the present application, the at least a side of the wound-type cell 1 in the width direction W is both sides or only one side.

In an embodiment of the lithium-ion battery according to the present application, the single-sided adhesive layer 3 may be a PET film whose surface is adhered with the flowable curing adhesive 4.

In an embodiment of the lithium-ion battery according to the present application, the flowable curing adhesive 4 may be one of polypropylene, polyvinyl acetate, epoxy resin and styrene-isoprene copolymer.

In an embodiment of the lithium-ion battery according to the present application, a thickness of the single-sided adhesive layer 3 may be 20 μm-200 μm, so as to meet the requirements for a required adhesive force and without increasing the thickness of the wound-type cell 1 at the same time.

In an embodiment of the lithium-ion battery according to the present application, flowing of the flowable curing adhesive 4 is realized by heating, furthermore, flowing of the flowable curing adhesive 4 may be realized by heating together with applying a pressure at the same time.

In an embodiment of the lithium-ion battery according to the present application, a surface of the packaging film 2 corresponding to the wound ending 11 of the wound-type cell 1 is flattened with a pressure. The lithium-ion battery is placed under the condition of a high temperature, a pressure is applied to the surface of the packaging film 2 corresponding to the wound ending 11 of the wound-type cell 1, which allows the flowable curing adhesive 4 to flow and flow out from the periphery of the single-sided adhesive layer 3 and spread out uniformly, so that the wound-type cell 1 and the packaging film 2 are adhered together better. In an embodiment, the applied pressure is not less than 0.2 MPa, the temperature is not lower than 70° C.

In an embodiment of the lithium-ion battery according to the present application, a surface of the packaging film 2 corresponding to the same side of the wound-type cell 1 in the width direction W is flattened with a pressure. The lithium-ion battery is placed under the condition of a high temperature, a pressure is applied to the surface of the packaging film 2 corresponding to the same side of the wound-type cell 1 in the width direction W, which allows the flowable curing adhesive 4 to flow out from the periphery of the single-sided adhesive layer 3 on the same side and spread out uniformly, so that the portions of the separator beyond the positive electrode plate and the negative electrode plate on the same side of the wound-type cell 1 in the width direction W are adhered together better. In an embodiment, the applied pressure is not less than 0.2 MPa, the temperature is not lower than 70° C.

In an embodiment of the lithium-ion battery according to the present application, referring to FIG. 1 and FIG. 2, the single-sided adhesive layer 3 adhered on the at least a side of the wound-type cell 1 in a width direction W further has a portion which extends onto an edge portion 12 of at least a surface of the wound-type cell 1 perpendicular to a thickness direction T; the portion of the single-sided adhesive layer 3 extending onto the edge portion 12 of the at least a surface of the wound-type cell 1 perpendicular to the thickness direction T allows the wound-type cell 1 and the packaging film 2 to be adhered together by the curing adhesive 4 which flows and flows out from a periphery of the portion of the single-sided adhesive layer 3 on the corresponding surface. Therefore, the problems of deforming of the wound-type cell 1, rupturing of the positive electrode tab and the negative electrode tab and bursting open of the top-seal which are caused by that the wound-type cell 1 slides in the packaging film 2 in the process of dropping or tumbling, are further prevented. In an embodiment, a surface of the packaging film 2 corresponding to the same side of the wound-type cell 1 in the width direction W is flattened with a pressure. In another embodiment, a surface of the packaging film 2 which is perpendicular to the thickness direction T and corresponds to the edge portion 12 onto which the single-sided adhesive layer 3 extends is flattened with a pressure.

Hereinafter examples and comparative examples, test procedures and test results of the lithium-ion battery according to the present application will be described.

Example 1

A positive electrode plate, a separator and a negative electrode plate of a lithium-ion battery (model No. 395073) were prepared, a width of the separator was greater than widths of the positive electrode plate and the negative electrode plate, and the positive electrode plate, the separator and the negative electrode plate were wound to form a wound-type cell 1; a wound ending 11 of the wound-type cell 1 was adhered with a PET film whose surface was adhered with polypropylene as a flowable curing adhesive having a thickness of 50 μm, the wound-type cell 1 was put into the packaging film 2 and then an electrolyte was injected and the packaging film 2 was sealed, the lithium-ion battery was placed under the condition of a high temperature of 75° C., a surface pressure of 0.5 MPa was applied to a surface of the packaging film 2 corresponding to the wound ending 11 of the wound-type cell 1, which allowed the polypropylene to flow out from a periphery of the PET film and spread out uniformly, the lithium-ion battery was formed and a drop test was performed, and a long-term cycle test was performed on the lithium-ion battery.

Example 2

A positive electrode plate, a separator and a negative electrode plate of a lithium-ion battery (model No. 395073) were prepared, a width of the separator was greater than widths of the positive electrode plate and the negative electrode plate, and the positive electrode plate, the separator and the negative electrode plate were wound to form a wound-type cell 1; a PET film whose surface was adhered with polyvinyl acetate as a flowable curing adhesive having a thickness of 50 μm was adhered on a wound ending 11 of the wound-type cell 1, and the wound-type cell 1 was put into the packaging film 2 and then an electrolyte was injected and the packaging film 2 was sealed, the lithium-ion battery was placed under the condition of a high temperature of 75° C., a surface pressure of 0.8 MPa was applied to a surface of the packaging film 2 corresponding to the wound ending 11 of the wound-type cell 1, which allowed polyvinyl acetate to flow out of a periphery of the PET film and spread out uniformly, the lithium-ion battery was formed and a drop test was performed, and a long-term cycle test was performed on the lithium-ion battery.

Example 3

A positive electrode plate, a separator and a negative electrode plate of a lithium-ion battery (model No. 395073) were prepared, a width of the separator was greater than widths of the positive electrode plate and the negative electrode plate, and the positive electrode plate, the separator and the negative electrode plate were wound to form a wound-type cell 1; a wound ending 11 of the wound-type cell 1 and both sides of the wound-type cell 1 in a width direction W each were adhered with a PET film whose surface was adhered with polyvinyl acetate as a flowable curing adhesive having a thickness of 80 μm, and the wound-type cell 1 was put into the packaging film 2 and then an electrolyte was injected and the packaging film 2 was sealed, the lithium-ion battery was placed under the condition of a high temperature of 75° C., a surface pressure of 0.8 MPa was applied to a surface of the packaging film 2 corresponding to the wound ending 11 of the wound-type cell 1, which allowed the polyvinyl acetate to flow out of a periphery of the PET film and spread out uniformly, the lithium-ion battery was formed and a drop test was performed, and a long-term cycle test was performed on the lithium-ion battery.

Example 4

A positive electrode plate, a separator and a negative electrode plate of a lithium-ion battery (model No. 395073) were prepared, a width of the separator was greater than widths of the positive electrode plate and the negative electrode plate, and the positive electrode plate, the separator and the negative electrode plate were wound to form a wound-type cell 1; a wound ending 11 of the wound-type cell 1 and both sides of the wound-type cell 1 in a width direction W each were adhered with a PET film whose surface was adhered with styrene-isoprene copolymer as a flowable curing adhesive having a thickness of 20 μm, and the wound-type cell 1 was put into the packaging film 2 and then an electrolyte was injected and the packaging film 2 was sealed, the lithium-ion battery was placed under the condition of a high temperature of 75° C., a surface pressure of 0.8 MPa was applied to a surface of the packaging film 2 corresponding to the wound ending 11 of the wound-type cell 1, which allowed the styrene-isoprene copolymer to flow out of a periphery of the PET film and spread out uniformly, the lithium-ion battery was formed and a drop test was performed, and a long-term cycle test was performed on the lithium-ion battery.

Example 5

A positive electrode plate, a separator and a negative electrode plate of a lithium-ion battery (model No. 395073) were prepared, a width of the separator was greater than widths of the positive electrode plate and the negative electrode plate, and the positive electrode plate, the separator and the negative electrode plate were wound to form a wound-type cell 1; a wound ending 11 of the wound-type cell 1 was adhered with a PET film whose surface was adhered with polyacrylate, both sides of the wound-type cell 1 in a width direction W each were adhered with a PET film whose surface adhered with styrene-isoprene copolymer as a flowable curing adhesive having a thickness of 50 μm (and the PET film whose surface was adhered with styrene-isoprene copolymer as the flowable curing adhesive having the thickness of 50 μm extended onto edge portions 12 on the two corresponding surfaces perpendicular to a thickness direction T), the wound-type cell 1 was put into the packaging film 2 and then an electrolyte was injected and the packaging film 2 was sealed, the lithium-ion battery was placed under the condition of a high temperature of 75° C., a surface pressure of 0.2 MPa was applied to surfaces of the packaging film 2 respectively corresponding to both sides of the wound-type cell 1 in the width direction W, the styrene-isoprene copolymer flows out of a periphery of the PET film and spread out uniformly, the lithium-ion battery was formed and a drop test was performed, and a long-term cycle test was performed on the lithium-ion battery.

Example 6

A positive electrode plate, a separator and a negative electrode plate of a lithium-ion battery (model No. 395073) were prepared, a width of the separator was greater than widths of the positive electrode plate and the negative electrode plate, and the positive electrode plate, the separator and the negative electrode plate were wound to form a wound-type cell 1; a wound ending 11 of the wound-type cell 1 and both sides of the wound-type cell 1 in a width direction W each were adhered with a PET film whose surface was adhered with styrene-isoprene copolymer as a flowable curing adhesive having a thickness of 50 μm, and the wound-type cell 1 was put into the packaging film 2 and then an electrolyte was injected and the packaging film 2 was sealed, the lithium-ion battery was placed under the condition of a high temperature of 75° C., a surface pressure of 0.2 MPa was applied to a surface of the packaging film 2 corresponding to the wound ending 11 of the wound-type cell 1, which allowed the styrene-isoprene copolymer to flow out of a periphery of the PET film and spread out uniformly, and a surface pressure of 0.2 MPa was applied to surfaces of the packaging film 2 respectively corresponding to the both sides of the wound-type cell 1 in the width direction W, so that portions of the separators beyond the positive electrode plate and the negative electrode plate on the same side of the wound-type cell 1 in the width direction W were adhered together better by styrene-isoprene copolymer, the lithium-ion battery was formed and a drop test was performed, and a long-term cycle test was performed on the lithium-ion battery.

Example 7

A positive electrode plate, a separator and a negative electrode plate of a lithium-ion battery (model No. 395073) were prepared, a width of the separator was greater than widths of the positive electrode plate and the negative electrode plate, and the positive electrode plate, the separator and the negative electrode plate were wound to form a wound-type cell 1; a wound ending 11 of the wound-type cell 1 and both sides of the wound-type cell 1 in a width direction W each were adhered with a PET film whose surface was adhered with styrene-isoprene copolymer as a flowable curing adhesive having a thickness of 200 μm, and the wound-type cell 1 was put into the packaging film 2 and then an electrolyte was injected and the packaging film 2 was sealed, the lithium-ion battery was placed under the condition of a high temperature of 75° C., a surface pressure of 0.2 MPa was applied to a surface of the packaging film 2 corresponding to the wound ending 11 of the wound-type cell 1, which allowed the styrene-isoprene copolymer to flow out of a periphery of the PET film and spread out uniformly, and a surface pressure of 0.2 MPa was applied to a surface of the packaging film 2 corresponding to the both sides of the wound-type cell 1 in the width direction W, so that the separators beyond the positive electrode plate and the negative electrode plate on the same side of the wound-type cell 1 in the width direction W were adhered together better by the styrene-isoprene copolymer, the lithium-ion battery was formed and a drop test was performed, and a long-term cycle test was performed on the lithium-ion battery.

Comparative Example 1

A positive electrode plate, a separator and a negative electrode plate of a lithium-ion battery (model No. 395073) were prepared, a width of the separator was greater than widths of the positive electrode plate and the negative electrode plate, and the positive electrode plate, the separator and the negative electrode plate were wound to form a wound-type cell 1; a wound ending 11 of the wound-type cell 1 was adhered with a PET film whose surface was adhered with polyacrylate, and the wound-type cell 1 was put into packaging film 2 and then an electrolyte was injected and the packaging film 2 was sealed, the lithium-ion battery was placed under the condition of a high temperature of 75° C., a surface pressure of 0.2 MPa was applied to a surface of the packaging film 2 corresponding to the wound ending 11 of the wound-type cell 1, the lithium-ion battery was formed and a drop test was performed, and a long-term cycle test was performed on the lithium-ion battery.

Comparative Example 2

A positive electrode plate, a separator and a negative electrode plate of a lithium-ion battery (model No. 395073) were prepared, a width of the separator was greater than widths of the positive electrode plate and the negative electrode plate, and the positive electrode plate, the separator and the negative electrode plate were wound to form a wound-type cell 1; a wound ending 11 of the wound-type cell 1 and both sides of the wound-type cell 1 in a width direction W each were adhered with a PET film whose surface was adhered with polyacrylate, and the wound-type cell 1 was put into packaging film 2 and then an electrolyte was injected and the packaging film 2 was sealed, the lithium-ion battery was placed under the condition of a high temperature of 80° C., a surface pressure of 0.5 MPa was applied to a surface of the packaging film 2 corresponding to the wound ending 11 of the wound-type cell 1, the lithium-ion battery was formed and a drop test was performed, and a long-term cycle test was performed on the lithium-ion battery.

Comparative Example 3

A positive electrode plate, a separator and a negative electrode plate of a lithium-ion battery (model No. 395073) were prepared, a width of the separator was greater than widths of the positive electrode plate and the negative electrode plate, and the positive electrode plate, the separator and the negative electrode plate were wound to form a wound-type cell 1; a wound ending 11 of the wound-type cell 1 and both sides of the wound-type cell 1 in a width direction W each were adhered with a PET film whose surface was adhered with styrene-isoprene copolymer as a flowable curing adhesive, and the wound-type cell 1 was put into packaging film 2 and then electrolyte was injected and the packaging film 2 was sealed, the lithium-ion battery was placed under the condition of a high temperature of 60° C., no pressure was applied to a surface of the packaging film 2 corresponding to the wound ending 11 of the wound-type cell 1 and a surface of the packaging film 2 corresponding to the both sides of the wound-type cell 1 in the width direction W, the lithium-ion battery was formed and a drop test was performed, and a long-term cycle test was performed on the lithium-ion battery.

Comparative Example 4

A positive electrode plate, a separator and a negative electrode plate of a lithium-ion battery (model No. 395073) were prepared, a width of the separator was greater than widths of the positive electrode plate and the negative electrode plate, and the positive electrode plate, the separator and the negative electrode plate were wound to form a wound-type cell 1; a wound ending 11 of the wound-type cell 1 and both sides of the wound-type cell 1 in a width direction W each were separately adhered with a PET film whose surface was adhered with styrene-isoprene copolymer as a flowable curing adhesive having a thickness of 10 µm, and the wound-type cell 1 was put into packaging film 2 and then an electrolyte was injected and the packaging film 2 was sealed, the lithium-ion battery was placed under the condition of a high temperature of 75° C., a surface pressure of 0.2 MPa was applied to a surface of the packaging film 2 corresponding to the wound ending 11 of the wound-type cell 1, which allowed the styrene-isoprene copolymer to flow out of a periphery of the PET film and spread out uniformly, the lithium-ion battery was formed and a drop test was performed, and a long-term cycle test was performed on the lithium-ion battery.

Comparative Example 5

A positive electrode plate, a separator and a negative electrode plate of a lithium-ion battery (model No. 395073) were prepared, a width of the separator was greater than widths of the positive electrode plate and the negative electrode plate, and the positive electrode plate, the separator and the negative electrode plate were wound to form a wound-type cell 1; a wound ending 11 of the wound-type cell 1 and both sides of the wound-type cell 1 in a width direction W each were adhered with a PET film whose surface was adhered with styrene-isoprene copolymer as a flowable curing adhesive having a thickness of 250 µm, and the wound-type cell 1 was put into the packaging film 2 and then an electrolyte was injected and the packaging film 2 was sealed, the lithium-ion battery was placed under the condition of a high temperature of 75° C., a surface pressure of 0.2 MPa was applied to a surface of the packaging film 2 corresponding to the wound ending 11 of the wound-type cell 1, which allowed the styrene-isoprene copolymer to flow out of a periphery of the PET film and spread out uniformly, the lithium-ion battery was formed and a drop test was performed, and a long-term cycle test was performed on the lithium-ion battery.

Test Procedures

Safety test (drop test): the lithium-ion batteries in the examples 1-7 (numbered as S1, S2, S3, S4, S5, S6, S7 respectively) and comparative examples 1-5 (numbered as D1, D2, D3, D4, D5 respectively) were fixed in a fixture of the drop test with a double-sided adhesive, an initial voltage V0 of the each wound-type cell 1 was measured, six surfaces of the fixture were numbered as 1, 2, 3, 4, 5, 6, four corners of the fixture were numbered as C1, C2, C3, C4, the fixture was placed on a test bench having a height of 1.5 m at the environment of a room temperature of 25° C., six surfaces of the wound-type cell 1 were dropped in turn according to the order of number 1-6, and then four corners of the wound-type cell 1 were dropped in turn according to the order of number C1-C4; the drop test was completed after 6 cycles, a final voltage V1 of the each wound-type cell 1 was measured after standing 1 hour, a voltage drop was recorded as Δ V in the dropping process, and whether the appearance packaging of the wound-type cell 1 was damaged or the top-seal was burst open were observed, the cell was disassembled and whether the electrode tab of the cell was ruptured was observed, and whether the portions of the separator on the both sides of the cell in the width direction W were displaced or wrinkled and whether the positive electrode plate and negative electrode plate came into contact and formed an internal short-circuiting were observed. The number of the lithium-ion batteries adopted by the each of examples and comparative examples were 20 for the above-mentioned test and statistics.

TABLE 1

Lithium-ion battery safety test results

| number | without damage and electrolyte leakage of the packaging film after the drop test | without the voltage drop after the drop test | without displacement and wrinkling of the separator after the drop test | without contacting and internal short-circuiting of the positive electrode plate and negative electrode plate after the drop test | without shrinking and short-circuiting of the separator after the long-term cycle |
|---|---|---|---|---|---|
| S1 | 100% | 80% | 60% | 80% | 80% |
| S2 | 100% | 80% | 60% | 80% | 80% |
| S3 | 100% | 100% | 100% | 100% | 100% |
| S4 | 100% | 100% | 100% | 100% | 100% |
| S5 | 60% | 100% | 100% | 100% | 100% |
| S6 | 100% | 100% | 100% | 100% | 100% |
| S7 | 100% | 100% | 100% | 100% | 100% |

TABLE 1-continued

Lithium-ion battery safety test results

| number | without damage and electrolyte leakage of the packaging film after the drop test | without the voltage drop after the drop test | without displacement and wrinkling of the separator after the drop test | without contacting and internal short-circuiting of the positive electrode plate and negative electrode plate after the drop test | without shrinking and short-circuiting of the separator after the long-term cycle |
|---|---|---|---|---|---|
| D1 | 20% | 30% | 15% | 30% | 70% |
| D2 | 30% | 35% | 25% | 35% | 70% |
| D3 | 60% | 50% | 40% | 50% | 70% |
| D4 | 70% | 80% | 80% | 80% | 80% |
| D5 | 100% | 100% | 100% | 100% | NA |

Table 1 showed that S1-S4 were compared, in the range of controlled parameters, the PET film with different adhesive (i.e. single-sided adhesive layer) was adhered on the wound ending 11 of the wound-type cell 1, so that the wound-type cell 1 and the packaging film 2 were adhered together, the drop test results showed that there were no damage and electrolyte leakage of the packaging film, the both sides of the wound-type cell 1 in the width direction W in S1, S2 each were not adhered with the single-sided adhesive layer, because the separator were not adhered, the wound-type cell 1 was disassembled and it was found that the proportion of displacement and wrinkling of the separator was 40% after dropping, the proportion of contacting and internal short-circuiting of the positive electrode plate and negative electrode plate was 20%; S3-S5 were compared, in the range of the control parameters, S5 adopted an ordinary single-sided adhesive layer film (that is the PET film whose surface was adhered with polyacrylate, which could not allow the wound-type cell 1 and the packaging film 2 to be adhered), although the styrene-isoprene copolymer as the flowable curing adhesive allowed the wound-type cell 1 and the packaging film 2 to be adhered at the edge portions 12, the wound-type cell 1 and the packaging film 2 could not be adhered effectively, the drop test results showed that the proportion of damage and electrolyte leakage of the packaging film 2 reached 40%, but the portions of the separator were adhered effectively by the curing adhesive 4 on the both sides of the wound-type cell 1 in the width direction W, wrinkling of the separator after dropping and shrinking and short-circuiting of the separator after the long-term cycle did not appear; the preparation process of S6 was applying a pressure of 0.2 MPa to the surface of the packaging film 2 corresponding to the both sides of the wound-type cell 1 in the width direction W, the portions of the separator beyond the same side of the wound-type cell 1 in the width direction W were adhered together by the curing adhesive 4, which had a good effect of preventing the lithium-ion battery from shrinking of the separator and short-circuiting in the long-term cycle; S1-S7 all adopted the flowable curing adhesive having a thickness of 20-200 μm, and the temperature was not lower than 70° C. and the pressure was not less than 0.2 MPa under which the lithium-ion battery was placed in the preparation process of the cell, which had a good adhering effect.

S1, S2 were compared with D1 and it could be found that, compared with the polyacrylate adhesive layer film D1 adopted, the single-sided adhesive layer film S1, S2 adopted effectively improved the problems of damage and wrinkling of the packaging film after the drop test; S3, S4 were compared with D2 and it could be found that, compared with the PET film with polyacrylate D2 adopted, the wound ending 11 of the wound-type cell 1 and the both sides of the wound-type cell 1 in the width direction W were adhered with the single-sided adhesive layer film S3, S4 adopted, which could completely solve the problems of damage and electrolyte leakage of the packaging film, displacement and wrinkling of the separator, internal short-circuiting and voltage drop after the drop test; S1-S4, S6, S7 were compared with D3 and it could be found that, the preparation process was required under the condition of 70° C. and the surface pressure of the cell not less than 0.2 MPa, the curing adhesive 4 of D3 had an insufficient flowability under the condition of 60° C., and the curing adhesive 4 could not spread out rapidly and uniformly under the condition of no pressure, so that it had a poor effect of adhering of the wound-type cell 1 and the packaging film 2 and adhering of the separators, and it could not solve the problem of shrinking of the separator in the long-term cycle process; S1-S7 were compared with D4, D5 and it could be found that, the thickness of the curing adhesive 4 was required to meet the requirements for 20-200 μm, an adhesive area and an adhesive force were too small to reach the effect of adhering the portions of the separator and adhering the wound-type cell 1 and the packaging film 2 if the thickness was too small, the cell was easily deformed and the cycling performance of the cell was affected if the thickness was too large.

What is claimed is:

1. A lithium-ion battery, comprising:
   a wound-type cell formed by winding a positive electrode plate, a separator and a negative electrode plate, a width of the separator being larger than a width of the positive electrode plate and the width of the separator being larger than a width of the negative electrode plate;
   an electrolyte;
   a packaging film packaging the wound-type cell and accommodating the electrolyte; and
   a single-sided adhesive tape having (i) adhesive on one side of the tape adhered to a wound ending of the wound-type cell and (ii) a non-adhesive side on the other side of the tape opposite the adhesive side and facing the packaging film;
   wherein the packaging film is in physical contact with the non-adhesive side of the tape and the packaging film and the wound-type cell are adhered together by a portion of the adhesive flowing out of the adhesive side of the tape and located at a periphery of the non-adhesive side of the tape.

2. The lithium-ion battery according to claim 1, wherein the tape is a PET (Polyethylene terephthalate) film, and the PET film comprises a surface which the adhesive is adhered to.

3. The lithium-ion battery according to claim 1, wherein a material of the adhesive is at least one selected from a group of polypropylene, polyvinyl acetate, epoxy resin and styrene-isoprene copolymer.

4. The lithium-ion battery according to claim 1, wherein a thickness of the tape is between 20 μm and 200 μm.

5. The lithium-ion battery according to claim 1, wherein a surface of the packaging film corresponding to the winding end wound ending of the wound-type cell is flattened under a pressure.

6. The lithium-ion battery according to claim 1, wherein the wound-type cell comprises at least one side, the separator comprises a portion beyond the positive electrode plate and the negative electrode plate, the at least one side of the wound-type cell in a width direction is adhered with the tape, the portion of the separator and the packaging film are adhered together by the adhesive which has flowed out from the periphery of the tape.

7. The lithium-ion battery according to claim 6, wherein both sides of the wound-type cell in the width direction are adhered with the tape.

8. The lithium-ion battery according to claim 6, wherein a surface of the packaging film corresponding to the side of the wound-type cell in the width direction is flattened under a pressure.

9. The lithium-ion battery according to claim 6, wherein the tape adhered to the side of the wound-type cell in the width direction further has a portion which extends onto an edge portion of a surface of the wound-type cell perpendicular to a thickness direction.

10. The lithium-ion battery according to claim 9, wherein a surface of the packaging film corresponding to the side of the wound-type cell in the width direction is flattened under a pressure.

11. The lithium-ion battery according to claim 9, wherein a surface of the packaging film which is perpendicular to the thickness direction and corresponds to the edge portion onto which the tape extends is flattened under a pressure.

* * * * *